United States Patent [19]
Taniguchi et al.

[11] Patent Number: 4,672,933
[45] Date of Patent: Jun. 16, 1987

[54] PRECOMBUSTION CHAMBER WITH INSULATING MEANS

[75] Inventors: Masato Taniguchi, Nagoya; Hisaharu Nishio, Tokai; Mitsuyoshi Kawamura, Aichi; Toshio Okumura, Kakamigahara, all of Japan

[73] Assignee: 501 NGK Spark Plug Co. Ltd., Aichi, Japan

[21] Appl. No.: 791,542

[22] Filed: Oct. 25, 1985

[30] Foreign Application Priority Data

Oct. 30, 1984 [JP] Japan .................................. 59-229697
Oct. 30, 1984 [JP] Japan .................................. 59-229698

[51] Int. Cl.$^4$ .............................................. F02B 19/16
[52] U.S. Cl. .................................... 123/270; 123/254; 123/271
[58] Field of Search ................ 123/270, 271, 273, 254

[56] References Cited

U.S. PATENT DOCUMENTS 4,426,966  1/1984  Hüther et al. ........................ 123/270

FOREIGN PATENT DOCUMENTS 58-162721   9/1983  Japan ................................. 123/270
59-7726     1/1984  Japan ................................. 123/271
59-188024  10/1984  Japan ................................. 123/271
59-188025  10/1984  Japan ................................. 123/271

Primary Examiner—Andrew M. Dolinar
Attorney, Agent, or Firm—Wegner & Bretschneider

[57] ABSTRACT

A precombustion chamber provided with an arrangement for thermally insulating a cylinder head of an internal combustion engine from a combustion gas in the precombustion chamber comprising: (a) a hollow ceramic body which provides a precombustion chamber and is disposed within the hollow space for the precombustion chamber; (b) a hollow fitting member disposed surrounding the hollow ceramic body within the hollow space for mitigating and absorbing the stress produced between the cylinder head and the hollow ceramic body; and (c) seal means for sealing a space between the hollow ceramic body and the fitting member to provide a closed space therebetween, wherein said hollow fitting member is tightly secured to the hollow ceramic body through the seal means.

16 Claims, 6 Drawing Figures

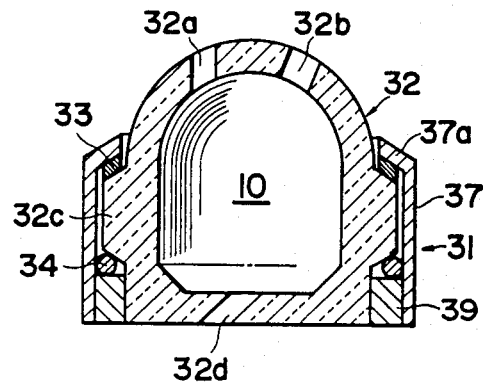
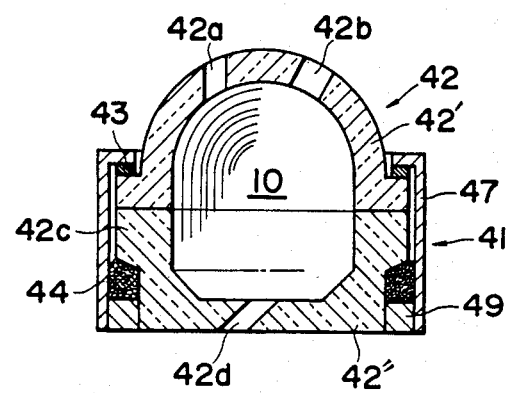

4,672,933

PRECOMBUSTION CHAMBER WITH INSULATING MEANS

FIELD OF THE INVENTION

The present invention relates to a precombustion chamber with insulating means, i.e., to an arrangement for thermal insulation for enhancing the combustion efficiency by thermally insulating a cylinder head from a combustion gas in the precombustion chamber, particularly of the swirl (or turbulence) chamber type, of an internal combustion engine.

BACKGROUND

Although various attempts have been made to form a mouth piece of the precombustion chamber by ceramics mainly for enhancing of the combustion efficiency of diesel engines, thermal insulation only at the mouth piece is not sufficient from the view point of performance. Research has recently been done to form the chamber by ceramics for thermally insulating the same. If the thermal insulator of ceramics is in contact with a hollow space provided in the cylinder head, heat dissipation would be high, resulting in a low thermal insulation effect. Therefore it has been proposed that an air thermal insulation layer be provided around the outer periphery of a ceramic body to compensate for the low thermal insulation. (Refer to Japanese Utility Model Kokai Publication No. B59-21024 entitled "Precombustion chamber for internal combustion engine".)

SUMMARY OF THE DISCLOSURE

It is very difficult to maintain complete sealing against the combustion gas at high temperature and pressure. In the aforementioned JP Utility Model Kokai, the side of the cylinder constituting a fitting portion between the cylinder head and the ceramic body in which a combustion chamber is formed is sealed between the cylinder head and a cylinder block by means of a gasket. Therefore the ceramic body is partly supported by the gasket when the cylinder head is assembled to the cylinder block. This involves disadvantages in that the precombustion chamber is unstable due to the fact that it is tilted or raised if the fabrication precision of the ceramic body is not so high and/or if the gasket or seal means deforms.

It is therefore an object of the present invention to provide an arrangement for thermally insulating a precombustion chamber having an excellent combustion efficiency in which sealing properties and mechanical stability are improved.

In accordance with the present invention there is provided a precombustion chamber provided with an arrangement for thermally insulating a cylinder head of an internal combustion engine from a combustion gas in the precombustion chamber comprising:

(a) a hollow ceramic body which provides a precombustion chamber and is disposed within the hollow space for the precombustion chamber within the cylinder head;

(b) a hollow fitting member disposed surrounding the hollow ceramic body within the hollow space for mitigating and absorbing the stress produced between the cylinder head and the hollow ceramic body; and (c) seal means for sealing a space between the hollow ceramic body and the fitting member to provide a closed space therebetween, wherein said hollow fitting member is tightly secured to the hollow ceramic body through the seal means.

The arrangement for thermally insulating a precombustion chamber of the present invention comprises the hollow ceramic body which is firmly fitted in the hollow space for the precombustion chamber by interposing between the hollow space and the hollow ceramic body a fitting member which mitigates and absorbs the stress produced between the cylinder head and hollow ceramic body, the fitting member being secured be interposing seal means between the hollow ceramic body and the fitting member. Thus the arrangement of the present invention can be fitted into the hollow space of the cylinder head by fitting techniques applicable to usual metal components, such as shrinkage fit, expansion fit, press-fit or the like. Therefore the present arrangement provides a high reliability of sealing at both fittings between the hollow ceramic body and fitting member and between the fitting member and the cylinder head, and is mechanically stable with respect to the cylinder head.

For the same reason the precombustion chamber is mechanically extremely stable and easy to handle, unlike the case in which it is made of only ceramics.

The space between the hollow ceramic body and the fitting member may be expanded to any desired size in order to enhance the thermal insulation effect. In this case sealing performance is remarkably excellent.

Since the dimensional accuracy of the fit between the hollow space of the cylinder head and the present arrangement depends upon only the fitting member, the freedom in design of the ceramic components becomes high and only a small portion of the entire surface requires precise finishing, e.g., grinding. Since the hollow ceramic body may comprise a plurality of portions according to the present invention, the ceramic body may be formed by well-known molding methods such as extrusion molding, slip casting molding, press-molding or the like, providing a significantly excellent productivity.

BRIEF DESCRIPTION OF THE DRAWINGS

FIGS. 3 to 5 are longitudinal sectional views showing further embodiments of the present invention.

DESCRIPTION OF PREFERRED EMBODIMENTS (Embodiment 1)

Figure 1:
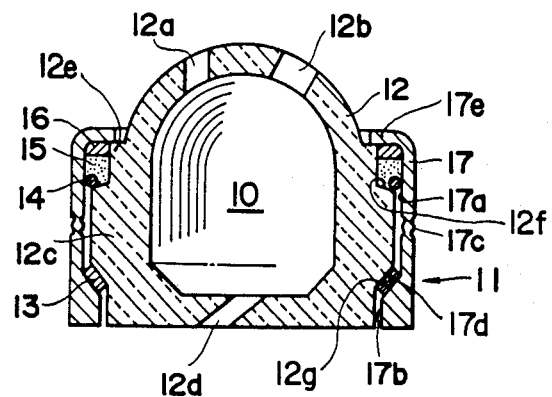
FIG. 1 is a longitudinal sectional view showing one embodiment of an arrangement for thermally insulating a precombustion chamber in accordance with the present invention.

Referring now to FIG. 1, which is a longitudinal sectional view showing an embodiment of an arrangement for thermally insulating a precombustion chamber in accordance with the present invention, the arrangement for thermally insulating a precombustion chamber 10 is generally designated by reference numeral 11. A hollow ceramic body 12 is provided with a glow plug insertion hole 12a and a fuel injection nozzle insertion hole 12b at the top thereof. The hollow ceramic body 12 is provided with a protruding collar portion 12c having a larger diameter along the periphery thereof. The hollow ceramic body 12 is also provided with a nozzle hole 12d at the bottom side thereof adjacent to a cylinder (not shown). The nozzle hole 12d extends through the bottom wall of the hollow ceramic body so that the precombustion chamber defined within the hollow ceramic body 12 communicates with a main combustion chamber (not shown) within the cylinder. Plate like packing 13, a bar-like packing 14, thermally insulating granules of inorganic material 15 and a press-fitting 16 are available as seal means between the hollow ceramic body 12 and a fitting member 17. The fitting member 17 is made of stainless steel SUS 403. The fitting member 17 is substantially of a cylindrical shape so that it completely surrounds at least the collar portion 12c of the hollow ceramic body 12. The fitting member 17 has an inner side which faces the collar portion so that a gap is defined therebetween as shown in FIG. 1. The fitting member 17 comprises a portion 17a having a larger inner diameter which extends in a direction from the collar portion 12c to the top and a portion 17b having a smaller inner diameter which faces the side of the bottom of the hollow ceramic body 12 other than the collar portion 12c.

In order to assembly the aforementioned components, the plate-like tapered packing 13 is firstly retained on a shoulder 17d formed between the larger inner diameter portion 17a and the smaller inner diameter portion 17b of the fitting member 17. The hollow ceramic body 12 is then fitted into the fitting member 17 through the larger inner diameter portion 17a. An O-ring packing 14 having a diameter larger than the spacing between the collar portion 12c and the larger diameter portion 17a is retained at the edge of the upper shoulder 12f of the collar portion 12c. A space defined by the outer surface of the upper portion 12e of the cylindrical portion of the hollow ceramic body 12 disposed above the collar portion 12c, and the larger diameter portion 17a and the O-ring packing 14 is filled with thermally insulating granules 15 of an inorganic material. After the granules have been compacted by a pressure plate (ring plate) 16, the upper end 17e of the larger inner diameter portion 17a is inwardly caulked to reduce the diameter. Due to the coaction of the plate-like tapered packing 13, the collar portion 12c, the O-ring packing 14, thermally insulating granules 15 and the pressure plate 17 which are sandwiched between the shoulder 17d between the larger inner diameter portion 17a and the smaller inner diameter portion 17b and the caulked, diameter reduced end 17e of the larger inner diameter portion 17a, an axial force is produced between the ceramic body and the fitting member, resulting in an arrangement 11 for the precombustion chamber comprising the fitting member 17 and the hollow ceramic body 12 which are firmly secured to each other.

The manner of application of the axial force necessary to tightly secure the fitting member 17 to the hollow ceramic body 12 is not limited to the aforementioned manner in which the end 17e of the larger inner diameter portion 17e is caulked and diameter-reduced. For example, a part of the larger inner diameter portion 17a may be preliminarily provided with a strip-like thickness-reduced groove 17c. After the collar portion 12c and the seal members have been loosely sandwiched by inwardly bending the end 17e of the larger inner diameter portion 17a, thermal caulking may be carried out by conducting a large electric current through the fitting member 17. By using both methods in a combined manner, the fitting member 17 may be more firmly fastened to the hollow ceramic body 12.

Although the types and combinations of the seal means are not limited to those in the aforementioned embodiment, it is preferred that the shoulder between the larger and smaller inner diameter portions and the side edge of the bottom of the collar portion facing thereto be tapered for the alignment of the hollow ceramic body and a disc-like (or tapered) packing be used for sealing the space between the tapered surfaces in the case where the smaller inner diameter portion of the fitting member 17 is formed at the bottom side. On the other hand, it is preferred that the seal member for sealing the space between the top side end of the collar portion 12c and the larger inner diameter portion 17a be an O-ring wire packing. Although sealing can be accomplished by using a single O-ring packing unlike in the aforementioned embodiment, use of the O-ring packing in combination with the thermally insulating granules of inorganic material and the press fit mitigates the axial mechanical impact on the hollow ceramic body due to elasticity of the granules.

Thermally insulating granules such as talc, magnesia, alumina, ferrite, mica powder are suitable for the inorganic thermally insulating granules.

(Embodiment 2)

Figure 2:
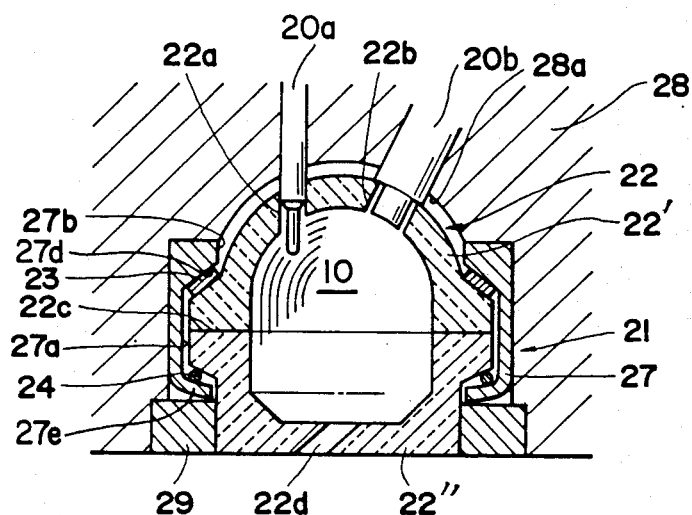
FIG. 2 is a longitudinal sectional view showing an alternative embodiment of an apparatus of the present invention which is mounted on a cylinder head.

Referring now to FIG. 2 which is a longitudinal sectional view showing an alternative embodiment of an arrangement 10 for thermally insulating the precombustion chamber 21 fitted into the hollow space 28a of the cylinder head, hollow ceramic body 22 is provided with a glow plug insertion hole 22a and a fuel injection nozzle hole 22b at the arched top portion thereof. The hollow ceramic body 22 is also provided with a collar portion 22c having a larger diameter at the periphery thereof and is provided with a nozzle hole 22d at the bottom thereof. The hollow ceramic body 22 of the present embodiment is different from that of embodiment 1 in that it is divided into top and bottom half portions 22' and 22", respectively, at the collar portion 22c. A plate packing 23 and an O-ring packing 24 are disposed between the hollow ceramic body 22 and a fitting member 27. The fitting member 27 is in a reverse shape to that shown in Embodiment 1. The fitting member 27 has a larger inner diameter portion 27d and a smaller inner diameter portion 27b at the inner surface thereof.

Upon assembling the components of the present arrangement, the plate packing 23 is first brought into engagement with a shoulder 27d between the larger inner diameter portion 27a and the smaller inner diameter portion 27b of the fitting member 27. The top half 22' of the hollow ceramic body 22 is fitted into the fitting member 27 through the larger inner diameter portion 27a. Then the bottom half 22" of the hollow ceramic body 22 is fitted into the fitting member 27. After the O-ring packing 24 is brought into engagement with the end of the collar portion 22c close to the cylinder, the end 27e of the larger inner diameter portion 27a is caulked to reduce the inner diameter. The fitting member 27 is fastened to the hollow ceramic body 22 to form the arrangement 21 for thermally insulating the precombustion chamber 21a. After the arrangement 21 has been fitted into a hollow space 28a of the cylinder head 28 by a conventional metal component fitting method such as press fit, shrinkage fit, the arrangement 21 is secured to the cylinder head 28 by means of a heat shield ring 29 which prevents the combustion gas from contacting with the caulked portion 27e. It is preferred to leave some clearance between the caulked portion 27e and the heat seal ring 29. Caulking of the fitting member 27 at the bottom half 22" of the hollow ceramic body 22 unlike the embodiment 1 makes it possible to carry out end surface machining of the fitting member 27 at the top thereof and provides easy axial positioning when the thermally insulating arrangement 21 is fitted into the hollow space 28a.

The glow plug 20a and the fuel injection nozzle 20b are inserted into the precombustion chamber 11a of the thermally insulating arrangement 21 secured to the hollow space 28a. In this case, it is not necessary to seal the top space defined by the ceiling of the hollow space 28a and the arched top portion of the hollow ceramic body 22 from the precombustion chamber 10.

After an engine incorporating the present arrangement was operated at 4000 rpm for 100 hours, the arrangement and the precombustion chamber was observed by lifting the cylinder head, which showed no defects at the ceramic members, no tilting, descent, indentation or deformation of the thermally insulating arrangement.

It has been found upon disassembling the arrangement 21 for thermally insulating the precombustion chamber that there was no sign of invasion of the combustion gas into the space between the inner surface of the fitting member 27 and the collar portion 22c, i.e., complete sealing was maintained.

(Embodiment 3)

Referring now to FIG. 3, which is a longitudinal sectional view showing an embodiment of an arrangement for thermally insulating the precombustion chamber in accordance with the present invention, the arrangement for thermally insulating a precombustion chamber 10 is generally designated by reference numeral 31. A hollow ceramic body 32 is provided with a glow plug insertion hole 32a and a fuel injection nozzle insertion hole 32b at the top thereof. The hollow ceramic body 32 is formed with a collar portion 32c having a larger diameter along the periphery thereof. The hollow ceramic body 32 is also provided with a nozzle hold 32d at the bottom side thereof adjacent to a cylinder (not shown). The nozzle hole 32d extends through the hollow body so that the precombustion chamber 10 defined within the hollow ceramic body 32 communicates with a main combustion chamber (not shown) within the cylinder. There are provided an annular plate packing 33 and an O-ring packing 14 as seal means between the hollow ceramic body 32 and fitting member 37.

The fitting member 37 is fitted to the outer periphery of the hollow ceramic body 32. The fitting member 37 has a stepped shoulder 37a at the inner side, which faces to the top end of the collar portion 32. A press fitting member 39 is press-fitted into a space defined by the inner side of the fitting member 37, the outer side of the hollow ceramic body extending from the collar portion 32c thereof.

In assembling the components, the annular plate packing 33 is interposed between the shoulder 37a of the fitting member 37 and the top end surface of the collar portion 32c. The hollow ceramic body 32 is fitted into the fitting member 37. The O-ring packing 34 having a larger diameter than the space distance between the inner side of the fitting member 37 and the collar portion 32c is inserted into the space between the fitting member 37 and the hollow ceramic body 32 and is retained on the end side of the collar portion 32c directed to the cylinder. The fitting member 37 is fastened to the hollow ceramic body 32 by press-fitting the press fitting member 39 therebetween to provide the arrangement 31 for thermally insulating the precombustion chamber.

It is preferred that the top end side of the collar portion 32c and the shoulder 37a facing thereto are tapered for alignment with the hollow ceramic body 32.

(Embodiment 4)

Referring now to FIG. 4, there is shown a further embodiment of an arrangement for thermally insulating the precombustion chamber of the present invention.

The thermally insulating arrangement 41 includes a hollow ceramic body 42 which is identical with the hollow ceramic body 32 of the embodiment 3 except for that the hollow ceramic body 42 is divided into a top half 42' and a bottom half 42" at the collar portion 42c. An annular plate packing 43 is retained on the top end side of the collar portion 42c similar to the plate packing 33 of embodiment 3. Thermally insulating granules of inorganic material such as talc are packed in the space defined by an end outer side of the hollow ceramic body 42 extending from the collar portion 42c towards the cylinder in order to seal the space between the inner side of the fitting member 47 and the collar portion 42c. A press fitting member 49 is press-fitted into the residual space which is not filled with the granules. Although the granular sealing material such as inorganic thermally insulating granules 44 is applicable only when the space between the inner side of the fitting member 47 and the collar portion 42c is narrow enough to be invaded by the granules (e.g., a space up to about 0.1 mm for talc etc.), it has a function to mitigate the mechanical impacts on the hollow ceramic body 42 due to its elasticity as well as to provide sealing and thermal insulating functions. If the O-ring packing 34 used in the embodiment 3 is preliminarily retained on the end side of the collar portion 42c close to the cylinder and the aforementioned space is sealed, the inorganic thermally insulating granules 44 can be packed even when the space is wide.

The arrangement 41 for thermally insulating the precombustion chamber is press-fitted into a hollow space of a cylinder head (not shown). The glow plug 20a and the fuel injection nozzle 20b are inserted into respective bores 42a and 42b in the arrangement 41.

After an engine incorporating the present apparatus was operated at 4000 rpm for 100 hours, the precombustion chamber was observed by lifting the cylinder head. It showed no defects at the ceramic members, no tilting, descent, indentation or deformation of the thermally insulating arrangement.

Upon disassembling the arrangement 41 for thermally insulating the precombustion chamber it has been found that there was no sign of invasion of combustion gas into the space between the inner surface of the fitting member 47 and the collar portion 42c so that complete sealing was maintained.

(Embodiment 5)

Figure 5:
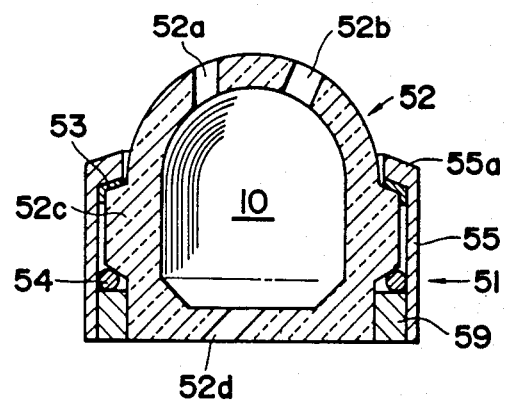
Figure 6:
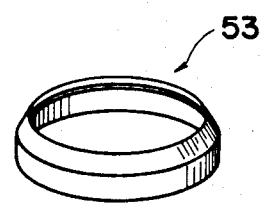
FIG. 6 is a perspective view showing an example of seal means applicable to the arrangement of the present invention.

Referring now to FIG. 5, there is shown a further embodiment 5 of an arrangement for thermally insulating the precombustion chamber of the present invention. The arrangement 51 of this embodiment is identical with that shown in FIG. 3 except for that the seal member 53 for sealing a space between the hollow ceramic body 52 and the fitting member 55 at the side of top thereof is not a plate packing, but a bevel packing having a dogleg shaped section as shown in FIG. 6. If such a bevel packing 53 is used, alignment of the ceramic hollow body 52 with the fitting member 55 is easier when the hollow ceramic body 52 is fitted into the fitting member 55 since the hollow ceramic body 52 is readily fixed with respect to the fitting member 55 in an axial direction.

It should be noted that the embodiments hereinabove mentioned are presented for a better illustration of the present invention and not for a limitative purpose. Modifications may be carried out within the gist and the concept of the present invention herein disclosed and claimed hereinbelow.

What is claimed is:

1. A precombustion chamber provided with an arrangement for thermally insulating a cylinder head of an internal combustion engine from a combustion gas in the precombustion chamber, comprising:
   (a) a hollow ceramic body which provides a precombustion chamber and is disposed within a hollow space within the engine for the precombustion chamber, the hollow ceramic body being provided with a protruding collar portion having an enlarged diameter along the periphery thereof to form a pair of shoulders;
   (b) a hollow metallic fitting member disposed around the hollow ceramic body within the hollow space for mitigating and absorbing the stress produced between the cylinder head and the hollow ceramic body, said fitting being secured to the collar portion of the ceramic body leaving a clearance between the ceramic body and the fitting member; and
   (c) seal means for sealing said clearance to provide a closed space therebetween, the seal means being secured between said shoulders and the fitting member.

2. The precombustion chamber as defined in claim 1 in which the seal means seal the space between the hollow ceramic body and the fitting member except a part of the space close to the cylinder.

3. The precombustion chamber as defined in claim 2 which further includes a press-fitted member press-fitted into an unsealed space close to the cylinder for tightly connecting the fitting member and the hollow ceramic body and for tightly securing the seal means.

4. The precombustion chamber as defined in claim 1 in which the hollow ceramic body comprises an integral body 5. The precombustion chamber as defined in claim 1 in which the hollow ceramic body comprises a plurality of separate portions.

6. The precombustion chamber as defined in claim 4 in which the hollow ceramic body is axially divided into two portions at the collar portion thereof.

7. The precombustion chamber as defined in claim 1 in which the seal means comprises at least one pair of seal members, each abutting one of said shoulders of said collar portion.

8. The precombustion chamber as defined in claim 7 in which the seal means further comprises thermally insulating granules or inorganic material.

9. The precombustion chamber as defined in claim 8 in which the insulating granules are secured between a seal member and a further ring member to sandwich insulating granules.

10. The precombustion chamber as defined in claim 1 in which the seal means comprise at least one sort of seal members selected from ring plate, O-ring or coiled wire.

11. The precombustion chamber as defined in claim 10 in which the ring plate comprises at least a conical portion.

12. The precombustion chamber as defined in claim 11 in which the ring plate further comprises an annular strip portion extending from the outer periphery of the conical portion.

13. The precombustion chamber as defined in claim 1 in which the fitting member is secured to the hollow ceramic body by caulking.

14. The precombustion chamber as defined in claim 1 in which the fitting member is firmly secured within the hollow space.

15. The precombustion chamber as defined in claim 14 in which the fitting member is mounted within the hollow space by press fit, shrinkage fit or expansion fit.

16. The precombustion chamber as defined in claim 1 in which the hollow ceramic body is disposed within the hollow space remaining a clearance between the top portion of the hollow ceramic body and the ceiling of the hollow space.

* * * * *